United States Patent [19]

Herb

[11] 4,393,548

[45] Jul. 19, 1983

[54] FOLDED HEAD CABLE TIE AND METHODS FOR MAKING AND USING THE SAME

[75] Inventor: Philip J. Herb, Somerville, N.J.

[73] Assignee: Thomas & Betts Corporation, Raritan, N.J.

[21] Appl. No.: 175,263

[22] Filed: Aug. 4, 1980

[51] Int. Cl.³ .............................................. B65D 63/00
[52] U.S. Cl. .................................. 24/16 PB; 24/206 A
[58] Field of Search .......... 24/16 PB, 206 A, 248 SL, 24/230 CF, 17 AD; 248/74 PB

[56] References Cited

U.S. PATENT DOCUMENTS

| | | | |
|---|---|---|---|
| 2,969,216 | 1/1961 | Hallsey | 248/71 |
| 2,977,145 | 3/1961 | Rifkin | 292/321 |
| 3,315,324 | 4/1967 | Ward | 24/16 |
| 3,471,109 | 10/1969 | Meyer | 248/68 |
| 3,588,964 | 6/1971 | Dudley et al. | 24/16 |
| 3,886,630 | 6/1975 | Emery | 24/16 PB |
| 3,900,922 | 8/1975 | McCormick | 24/16 PB |
| 3,900,923 | 8/1975 | Thomas | 24/16 PB |
| 4,008,512 | 2/1977 | Prodel | 24/16 PB |
| 4,141,565 | 2/1979 | Shields | 24/16 PB |

FOREIGN PATENT DOCUMENTS

| | | | |
|---|---|---|---|
| 1103058 | 3/1961 | Fed. Rep. of Germany | 24/16 PB |
| 1196312 | 5/1958 | France | 24/16 |

*Primary Examiner*—Robert A. Hafer
*Attorney, Agent, or Firm*—Robert M. Rodrick; Salvatore J. Abbruzzese; Jesse Woldman

[57] ABSTRACT

A cable tie is formed as a blank having an end extent with first teeth disposed between perforations and a body extent having second teeth extending with the first teeth from a common blank surface. The body extent is drawn through one of the perforations to form a box-like head. The body extent is then arranged about cables to be bundled and is drawn through the head whereupon the first and second teeth interlock to retain the bundled cables.

16 Claims, 6 Drawing Figures

FOLDED HEAD CABLE TIE AND METHODS FOR MAKING AND USING THE SAME

FIELD OF THE INVENTION

This invention relates to self-latching ties for the bundling of electrical cables and like articles and pertains more particularly to ties wherein the head thereof is formed from an elongate flat resilient member also providing the tail of the tie for encircling objects to be retained.

BACKGROUND OF THE INVENTION

Present commercially significant cable ties are typically comprised of a molded plastic body having a solid three-dimensional head portion defining an opening for the passage of an integral resilient tail therethrough, the head and tail having interfitting complemental teeth for retaining the tail and head in latched relation on pulling of the tail through the head about electrical cables or the like intended to be retained. Such commercial devices generally include a barb formed within the head of common plastic material therewith or comprising a metallic element joined with the head in manufacture. The tail has a plurality of longitudinally successive teeth which interfit with the barb to provide for the latching of head and tail. To the extent that the commercial devices require a solid head member, they are wasteful of material for the tensile strength obtained and costly in manufacture. Further, quite demanding tolerances apply to the head and tail and insertion force is generally undesirably high as a result of such tolerances. Also, since the head is an integrally solid member, and the barb is fixedly disposed therein, such commercial articles of manufacture do not provide for any adaptiveness in the head in relation to strain imposed thereon by the tail resulting from forces in turn imposed on the tail by retained electrical cables or the like.

While tie devices of different character and discussed in the statement filed herein pursuant to 37 CFR 1.97 and 1.98 may not have seen commercial implementation, such devices do depart from the customary commercial cable tie configuration in not requiring a solid three-dimensional head. Included in such devices covered in the statement are open-head structures which lend themselves toward lessening of waste material and simpler fabrication. On the other hand, such devices do not involve adaptiveness in the head, particularly in the disposition of the parts thereof, responsive to forces arising in the course of securement of the devices in retaining relation to electrical conductors or like articles to be retained.

SUMMARY OF THE INVENTION

It is an object of the present invention to provide articles of manufacture for the bundling of electrical cables and the like which are both simplified in manufacture and which lend themselves more appropriately to the cable bundling operation.

It is a more particular object of the invention to provide improved cable ties having simplified head structure which is adaptive to the forces imposed on the tail in encircling and retaining electrical cables.

Still other objects of the invention are simplified methods for forming self-latching ties and for bundling cables and the like.

In attaining the foregoing and other objects, the invention provides a self-latching tie comprised of a resilient elongate member having an end portion thereof folded to provide a box-like head which provides a passage therethrough for receiving an integral tail portion, the head defining teeth for engagement with complementary tail teeth and supporting such teeth for movement responsive to forces imposed on the tail. In a particularly preferred embodiment, the resilient member includes an end portion which is folded into box-like configuration, inclusive of a floor, a ceiling and sidewalls, such parts being hingeably interconnected to provide a relative tilting motion, the tie tail being received in such head and imposing tilting force upon the box-like configuration lessening the spacing between ceiling and floor to lockingly engage the tail therewithin.

In forming ties of the invention, a longitudinal end extent of an elongate resilient member is perforated and longitudinally spaced teeth sets are formed on a common surface thereof. The tail of the member and its body extent are drawn through one of the perforations whereby the end extent is formed in such box-like configuration. In using the thus formed tie, the body extent is arranged in encircling relation to a bundle of cables and the tie tail is drawn through the head until suitable tension is reached, whereupon the teeth sets are mutually lockingly engaged.

The foregoing and other objects and features of the invention will be further evident from the following detailed description of a preferred embodiment and methods thereof and from the drawings which employ like reference numerals to identify like parts throughout.

DESCRIPTION OF THE PREFERRED EMBODIMENT

Figure 1:
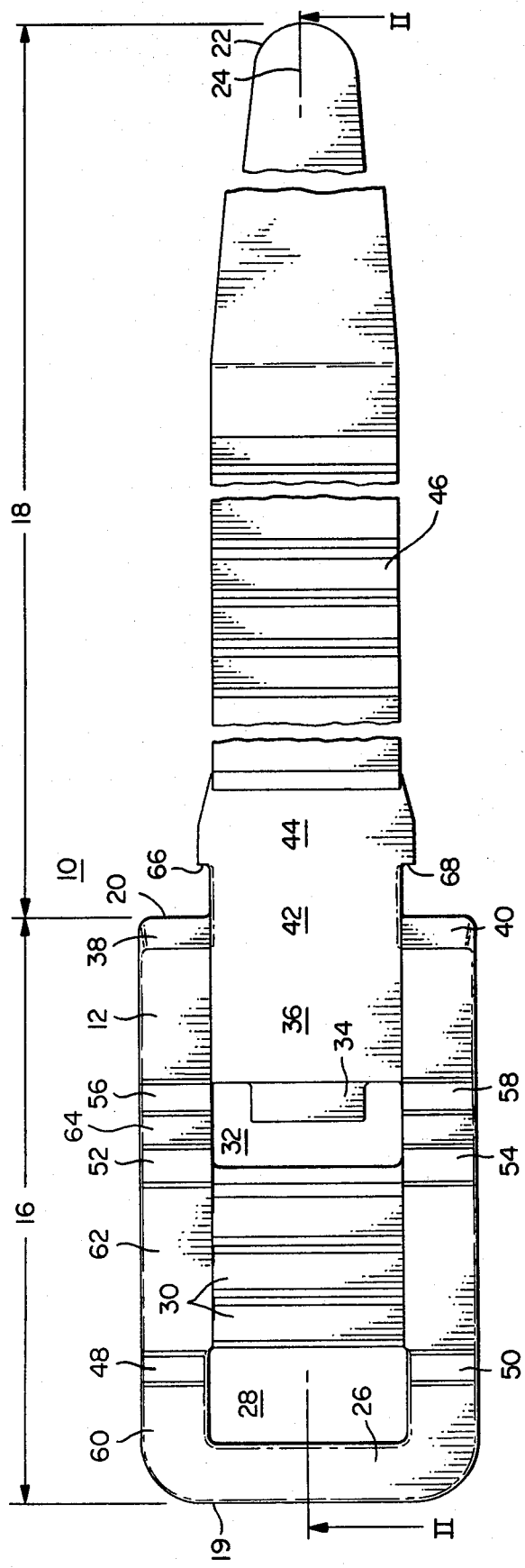
FIG. 1 is a plan elevation of a cable tie constructed in accordance with the invention.
Figure 2:
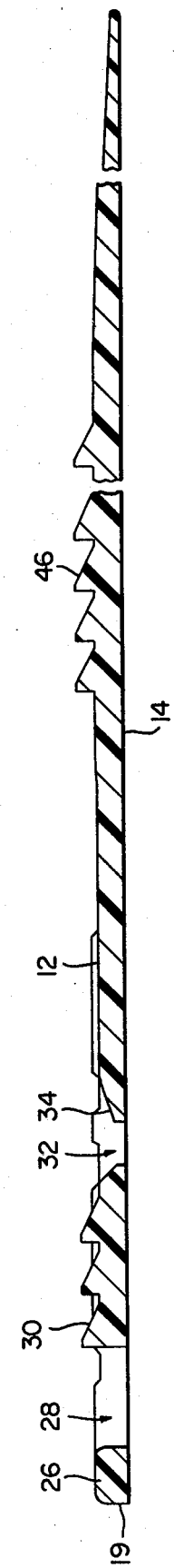
FIG. 2 is a sectional view as seen from plane II—II of FIG. 1.

Referring to FIGS. 1 and 2, blank 10 is formed of a suitable plastic material to provide a resilient elongate member. Blank 10 has opposed surfaces 12 and 14 and may be considered as having two longitudinal extents, i.e., an end extent 16 between surfaces 19 and 20, and a body extent 18 between surface 20 and tail tip 22. End extent 16 includes, in longitudinal succession along central axis 24, a lateral rib 26, opening 28, teeth 30, opening 32, lip 34 and expanse 36, having beveled outer portions 38 and 40. In like longitudinal sense, i.e., rightwardly in FIG. 1, body extent 18 has a reduced lateral width section 42 continuous with expanse 36, a widened section 44, teeth 46 and the above-mentioned tail tip 22. As indicated, teeth 30 extend transversely of blank 10, preferably orthogonally to axis 24, and taper from an apex outward of surface 12, in the direction of such longitudinal succession above noted, to surface 12. Teeth 46 are preferably of like configuration to teeth 30 and exceed teeth 30 in number, being generally provided along almost the entirety of body extent 18 to facilitate the bundling of different diametric groupings of cables and the like. Teeth 46 also extend outwardly of blank surface 12 and taper, as in the case of teeth 30, longitudinally rightwardly to surface 12 from apices outwardly of such surface. Tail tip 22 is generally flat along surface 12 and has side margins tapering rightwardly in FIG. 1 toward central axis 24. Undersurface 14 of blank 10 is generally flat throughout, as indicated in FIG. 2.

Referring again to blank end extent 16, areas of reduced thickness are provided at 48–50, 52–54 and 56–58. Areas 48 and 50 are laterally opposite and extend from the upper side margin of blank 10 to opening 28 and from opening 28 to the lower side margin of blank 12, thereby defining a hinge for interconnecting and permitting relative folding movement of blank sections 60 and 62 which extend between surface 18 and areas 48–50 and between these areas and areas 52–54. Areas 52 and 54 likewise extend from side margins of blank 10 to opening 32 and provide hinges for interconnecting and permitting relative folding movement between blank section 62 and blank section 64 running from areas 52–54 to areas 56–58. Areas 56 and 58 also extend from side margins of blank 10 to opening 32 and provide a hinge between blank expanses 64 and 36.

In manipulating blank 12 to provide a self-latching tie, one folds the blank about all of the hinges such that blank section 62 constitutes a ceiling having downwardly depending teeth 30 and sections 60 and 64 sideward of ceiling 56 become upright walls. To provide a floor for such open ceiling-wall configuration, one now takes tail tip 22 and inserts same through opening 28, the tail tip entering opening 28 at surface 12 and exiting at surface 14. The tail is pulled outwardly of opening 28 until the entirety of body extent 18 passes through the opening and section 42 of the body extent is in registry with opening 28. At this juncture, sidewall 60 is retained in registry with expanse 42 by the action of detent surfaces 66 and 68 which bear now against blank undersurface 14.

Figure 3:
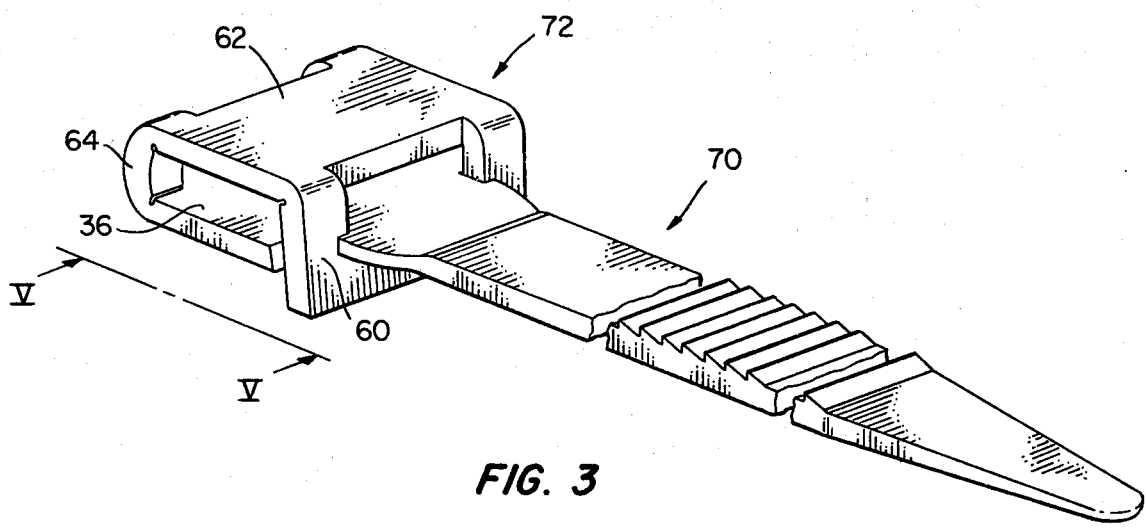
FIG. 3 is a perspective view of the FIG. 1 cable tie at the stage in which the head portion thereof is formed by folding and other manipulation of the FIG. 1 structure.
Figure 5:
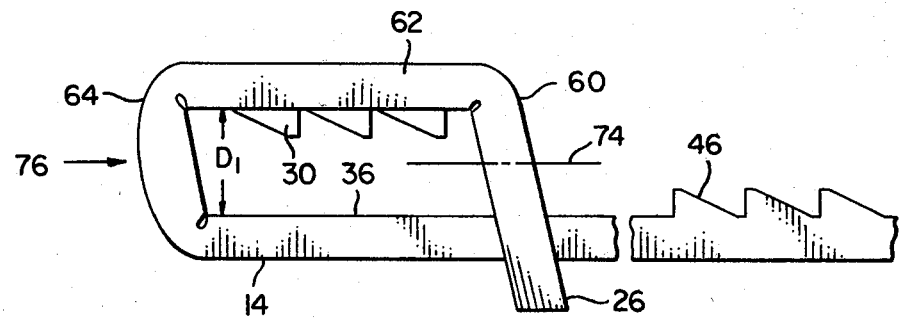
FIG. 5 is a front elevation of the cable tie head as formed in the FIG. 3 arrangement as seen from plane V—V thereof.

The end result of such manipulation is shown in FIG. 3 where self-latching tie 70 includes a box-like head 72 having the aforementioned ceiling 62, floor 36 and sidewalls 60 and 64. As is seen in FIG. 5, teeth 30 depend downwardly from ceiling 62 and rib 18 is disposed along the undersurface 14. Teeth 30 and 46 are now in facing relation to a common plane 74 therebetween, which plane also is in registry with a passage or longitudinal opening 76 extending through sidewall 64 via opening 32, then bounded by ceiling 62 and floor 36 and then extending through sidewall 60 via opening 28. Lip 34 provides a tapered access inlet to passage 76.

Head 72 is shown with a measure of counterclockwise tilt in FIG. 5, due to the compliant resistance of the hinges between floor 36 and sidewall 64, between sidewall 64 and ceiling 62 and between ceiling 62 and sidewall 60 to permit the parts to assume mutually orthogonal relation. In such relaxed tilt configuration, a spacing $D_1$ exists between ceiling 62 and floor 36.

Figure 4:
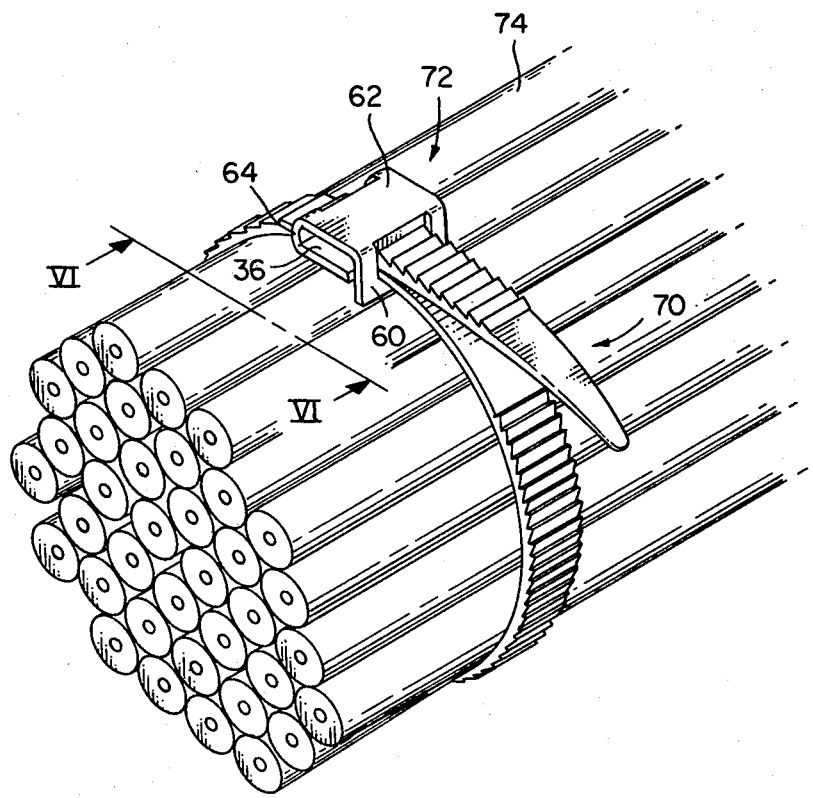
FIG. 4 is a perspective view of the cable tie of FIG. 1 in configuration shown in FIG. 3 and further in retaining relation to a bundle of electrical cables.
Figure 6:
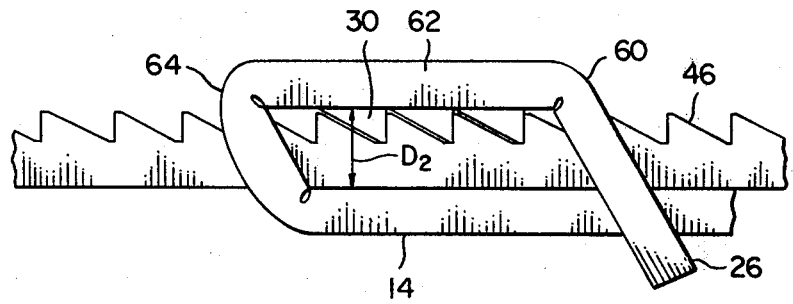
FIG. 6 is a front elevation of the cable tie head in latched arrangement with the tail of the cable tie in the FIG. 4 arrangement as seen from plane VI—VI thereof.

Referring now to FIGS. 4 and 6, tie 70 is arranged in encircling relation to electrical cables 78, for example, and the tail tip is inserted into passage 76 and drawn therethrough by pulling pressure along the longitudinal axis of the tie, as by hand or with the assist of pulling tools, until the cables are bundled at appropriate tension. At this juncture, the interengagement of complemental teeth 30 and 46 communicates to the cable tie head 72 a longitudinally leftward pulling force, based on tension induced longitudinally in the cable tie by the bound articles, whereupon the head adaptively changes its configuration from that shown in FIG. 5 to that shown in FIG. 6, i.e., a counterclockwise pivotal movement giving rise to and enhanced clockwise head tilt from that of FIG. 5 and a lessening of the spacing between ceiling 62 and floor 36, i.e., from $D_1$ (FIG. 5) to $D_2$ (FIG. 6). This adaptive action on the part of the head facilitates, on the one hand, an ease of insertion of the tail tip into the head opening at the outset of article bundling and facilitates the pulling of the tie body extent through the opening in the course of bundling. On the other hand, at the point of completion of the bundling activity, or on any release of pulling force on the tie tail, the variation in head configuration provides for an increase in the holding capability of the tie, providing for a closer nesting of teeth 30 and 46 within head 72. As will also be seen, surface 14 of the tie beneath head 72 may more readily conform to the bound article configuration than can solid heads of the above-noted commercial ties, since it is resilient and planar.

In the making of ties in accordance with the invention, simple flat stock may be extruded or otherwise blank-formed. Perforations may now be made in an end extent, e.g., openings 28 and 32. Teeth sets 30 and 46 may be formed in the course of extrusion, as may hinge areas 50–58, as desired. The openings 28 and 32 are made of lateral expanse not less than the lateral expanse of body extent 18, preferably exceeding the lateral dimensions of tail 22 and body extent 18.

Various changes to the foregoing will now be seen by those skilled in the art and may evidently be introduced without departing from the invention. Thus, the particularly disclosed and described embodiment and practices are intended in an illustrative and not in a limiting sense. The true spirit and scope of the invention is set forth in the following claims.

What is claimed is:

1. A self-latching tie comprised of a resilient elongate member having an end extent of folded walls defining a box-like head, said member having a body extent extending integrally and continuously with one wall of said head through an opening in another wall of said head and defining a tail, said head having a longitudinal passage therethrough bounded on opposed sides by walls of said member end extent inclusive of said one wall for receiving said tail, said head and said tail having respective complemental engagement means for securing said tail in such head passage.

2. The tie claimed in claim 1 wherein said first tooth means comprises a plurality of first teeth tapering to said first surface in the direction of said longitudinal succession.

3. The tie claimed in claim 2 wherein said second tooth means comprises a plurality of second teeth in number exceeding said first teeth and tapering to said first surface in the direction of said longitudinal succession.

4. The tie claimed in claim 3 wherein said first and second teeth extend orthogonally to the longitudinal axis of said member.

5. The article claimed in claim 1 wherein said member is of given lateral expanse in the extent thereof in registry with said second tooth means, said first and second openings being of lateral expanses not less than said given lateral expanse.

6. The tie claimed in claim 5 wherein said first and second openings are of common lateral expanse exceeding said given lateral expanse.

7. The article claimed in claim 1 further including a tail portion longitudinally successive to said second tooth means, said first surface being generally flat in said tail portion.

8. The tie claimed in claim 7 wherein said member defines side margins in said tail portion tapering in the direction of said longitudinal succession.

9. The tie claimed in claim 8 wherein the terminal extent of said tail portion is of lateral expanse less than the lateral expanses of said first and second openings.

10. The tie claimed in claim 1 wherein said member includes a further portion longitudinally successive to and contiguous with said second opening, said first surface tapering to said second surface in said further portion in direction opposite to the direction of said longitudinal succession.

11. The tie claimed in claim 1 formed from a blank, comprising a resilient elongate member having first and second opposite surfaces, said member defining in longitudinally sequential succession, a first opening extending through said first and second surfaces, first tooth means extending transversely of said member and outwardly of said first surface, a second opening extending through said first and second surfaces and second tooth means extending transversely of said member and outwardly of said first surface.

12. The tie claimed in claim 1 wherein said member end extent has plural sections hingeably interconnected to permit changes in respective orientations thereof.

13. The tie claimed in claim 12 wherein said member end extent includes a floor continuous with said member body extent, a first wall hingeably connected to said floor, a ceiling hingeably connected to said first wall and a second wall hingeably connected to said ceiling.

14. The tie claimed in claim 13 wherein said second wall defines an opening therethrough, said body extent being in part resident in such second wall opening.

15. The tie claimed in claim 14 wherein said first wall defines an opening therethrough in longitudinal alignment with said second wall opening.

16. The tie claimed in claim 15 wherein such head longitudinal opening is bounded by said ceiling and said floor and is in registry with both such openings in said first and second walls.

* * * * *